(12) United States Patent
Webber et al.

(10) Patent No.: US 11,146,125 B2
(45) Date of Patent: Oct. 12, 2021

(54) PERMANENT MAGNET MACHINE

(71) Applicant: STEERING SOLUTIONS IP HOLDING CORPORATION, Saginaw, MI (US)

(72) Inventors: Kenneth Webber, Saginaw, MI (US); Delynn Streng, Freeland, MI (US); Iftekhar Hasan, Akron, OH (US); Yilmaz Sozer, Stow, OH (US); Alejandro J. Pina Ortega, Saginaw, MI (US); Jeffrey T. Klass, Kawkawlin, MI (US); Mohammed R. Islam, Saginaw, MI (US)

(73) Assignees: Steering Solutions IP Holding Corporation, Saginaw, MI (US); The University of Akron, Akron, OH (US)

( * ) Notice: Subject to any disclaimer, the term of this patent is extended or adjusted under 35 U.S.C. 154(b) by 63 days.

(21) Appl. No.: 16/211,699

(22) Filed: Dec. 6, 2018

(65) Prior Publication Data

US 2020/0185983 A1   Jun. 11, 2020

(51) Int. Cl.
*H02K 1/17* (2006.01)
*H02K 5/24* (2006.01)
*H02K 1/16* (2006.01)

(52) U.S. Cl.
CPC .............. *H02K 1/17* (2013.01); *H02K 1/165* (2013.01); *H02K 5/24* (2013.01)

(58) Field of Classification Search
CPC ............ H02K 1/17; H02K 1/165; H02K 5/24; H02K 1/12; H02K 1/14; H02K 1/16; H02K 1/18

USPC .... 310/216.001, 216.055, 216.068–216.074, 310/89
See application file for complete search history.

(56) References Cited

U.S. PATENT DOCUMENTS

| | | | | |
|---|---|---|---|---|
| 6,885,125 | B2* | 4/2005 | Inayama | H02K 1/278 29/596 |
| 2003/0062780 | A1* | 4/2003 | Kaneko | H02K 1/20 310/58 |
| 2004/0119367 | A1* | 6/2004 | Hiwaki | H02K 1/185 310/254.1 |
| 2004/0124731 | A1* | 7/2004 | Kimura | F04C 23/008 310/216.044 |

FOREIGN PATENT DOCUMENTS

| | | | |
|---|---|---|---|
| DE | 102014226593 A1 * | 6/2016 | ............. H02K 1/185 |
| DE | 102014226593 A1 | 6/2016 | |

OTHER PUBLICATIONS

Machine Translation, BARTH, DE-102014226593-A1, Jun. 2016. (Year: 2016).*
English translation of Office Action regarding corresponding DE App. No. 10 2019 132 757.1; dated Aug. 19, 2020.

* cited by examiner

*Primary Examiner* — Thomas Truong
(74) *Attorney, Agent, or Firm* — Dickinson Wright PLLC

(57) ABSTRACT

A permanent magnet machine includes a machine housing and a stator. The machine housing has an inner surface. The stator is disposed within the machine housing. The stator has a stator core having an exterior surface. At least one of the inner surface and the exterior surface defines a discontinuous region that is arranged to minimize points of contact between the inner surface and the exterior surface.

4 Claims, 4 Drawing Sheets

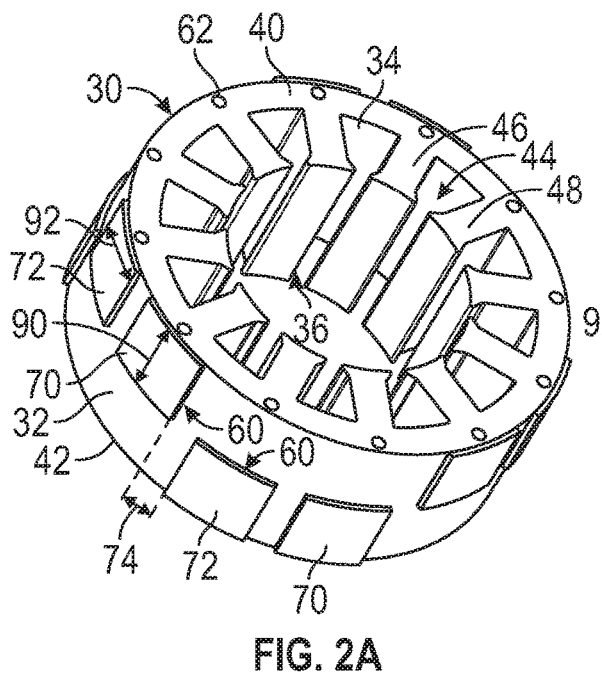
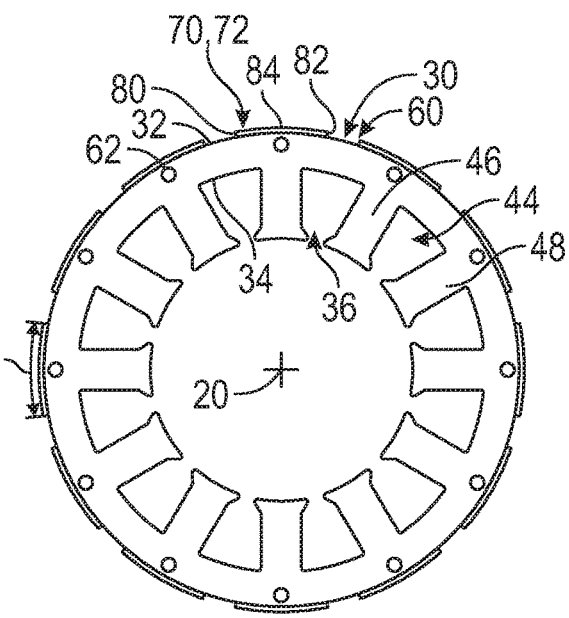
FIG. 2A
FIG. 2B
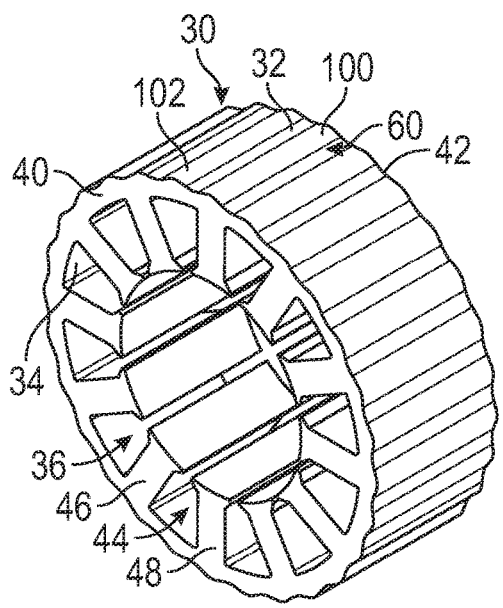
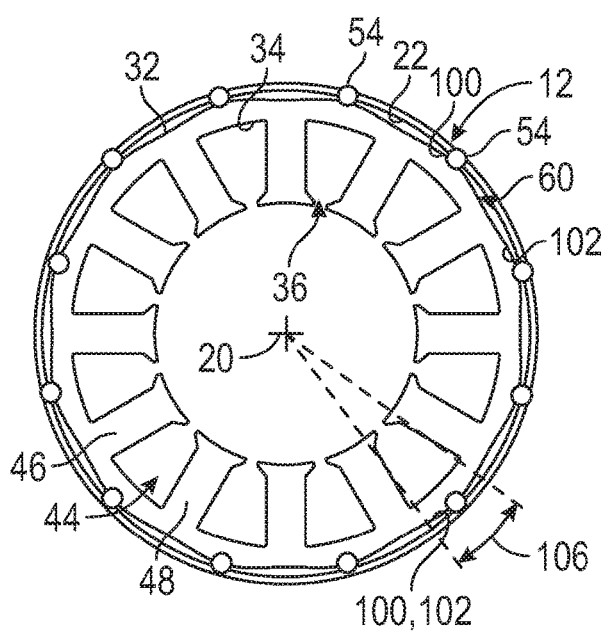
FIG. 3A
FIG. 3B

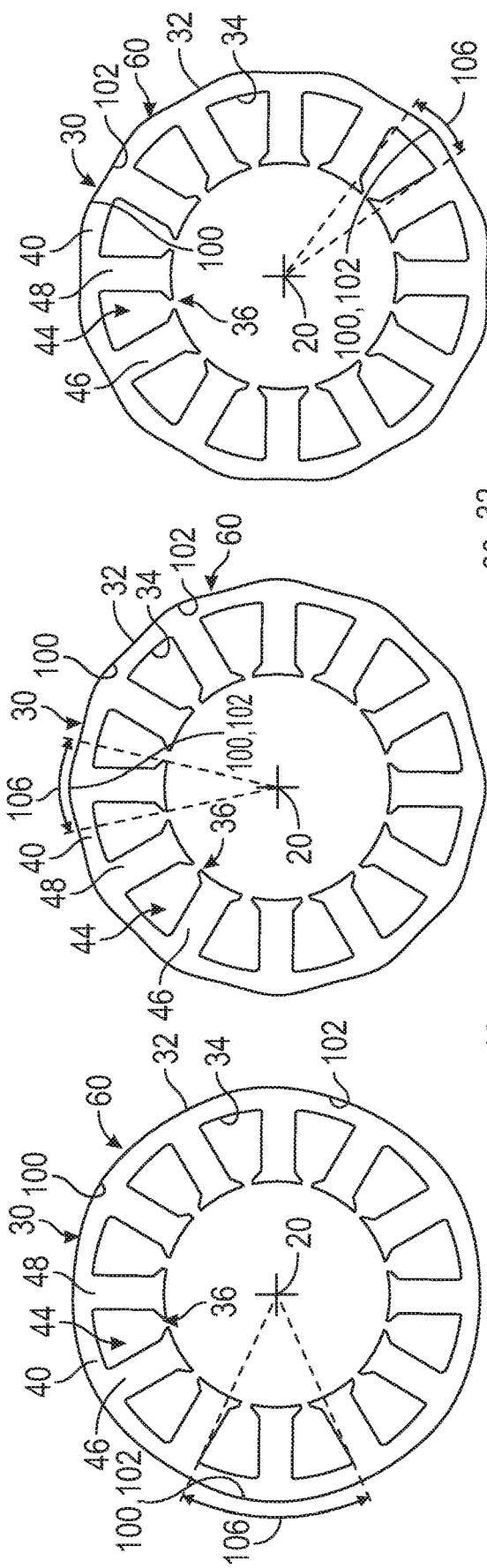
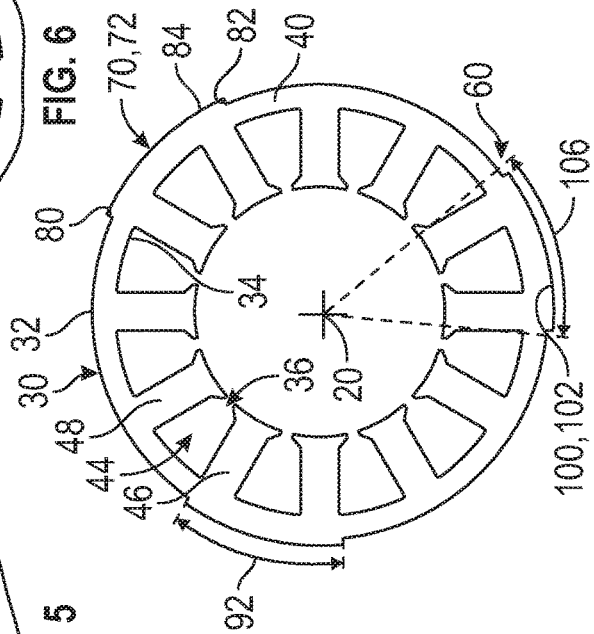
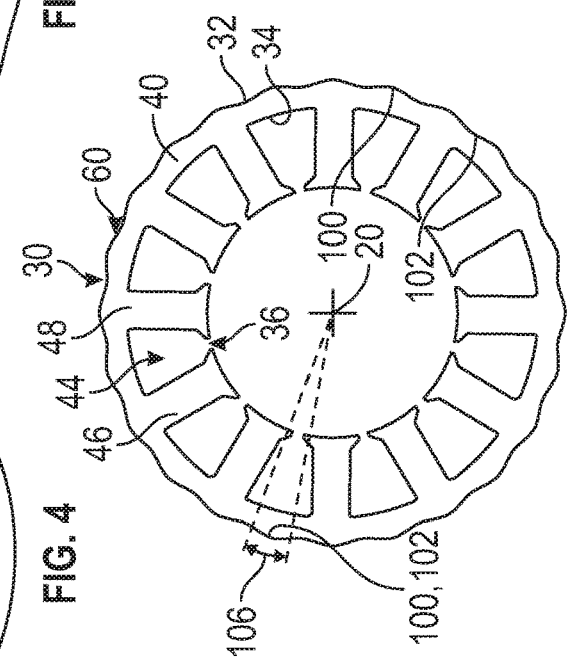

PERMANENT MAGNET MACHINE

BACKGROUND

Electric machines are used in automotive systems, precision tooling, or industrial drives and may have specific requirements to operate with low noise and vibration. Some sources of noise, vibration, or harshness in the electric machine may be cogging torque, torque ripple, and electromagnetic radial forces in addition to other aerodynamic or mechanical sources. An electric machine with high torque density generally has higher potential for noise and vibration that may be viewed as unacceptable. Different methods have been employed to mitigate the noise and vibrations from the electric machine, however as demands for higher torque density increases, new strategies or configurations to mitigate noise and vibrations from the electric machine must be developed.

SUMMARY

Disclosed is a permanent magnet machine that includes a machine housing and a stator. The machine housing has an inner surface that extends between a first housing end and a second housing end along a central longitudinal axis. The stator is disposed within the machine housing. The stator has a stator core having an exterior surface that extends between a first face and a second face along the central longitudinal axis. At least one of the inner surface and the exterior surface defines a discontinuous region that is arranged to minimize points of contact between the inner surface and the exterior surface.

Also disclosed is a stator provided with a permanent magnet machine that includes a stator core. The stator core is disposed about a central longitudinal axis. The stator core has an exterior surface defining a discontinuous region, an interior surface disposed opposite the exterior surface, the exterior surface and the interior surface each extending between a first face and a second face along the central longitudinal axis, and a plurality of stator teeth radially extending from the interior surface towards the central longitudinal axis.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 2A and 2B are views of a stator having a discontinuous region;

FIGS. 3A and 3B are views of a stator having a discontinuous region; and

FIGS. 4-8 are various views of a stator having a discontinuous region.

DETAILED DESCRIPTION

Referring now to the Figures, where the invention will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1A:
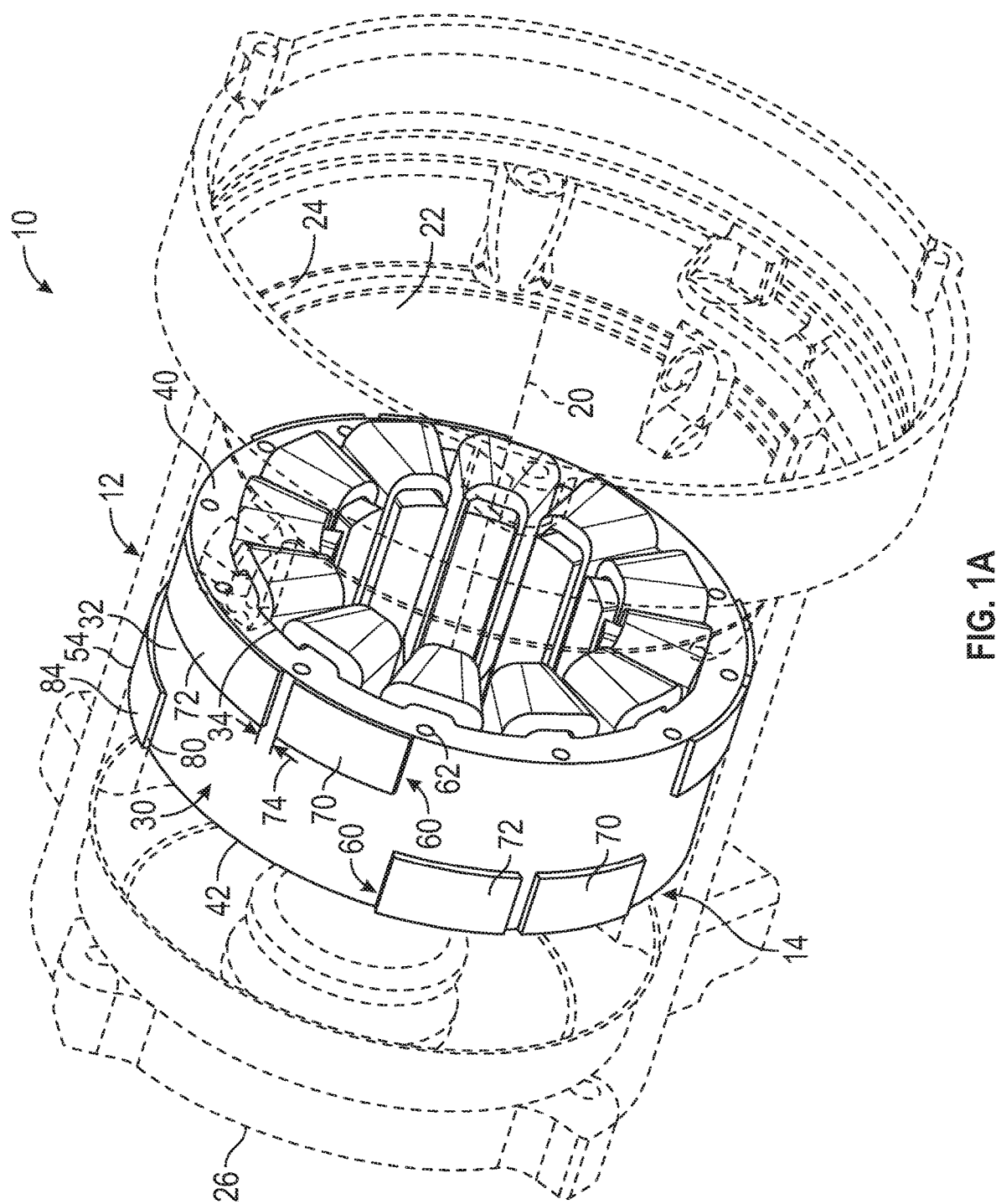
FIG. 1A is a partial perspective view of a stator defining a discontinuous region that is disposed within an electric machine housing.
Figure 1B:
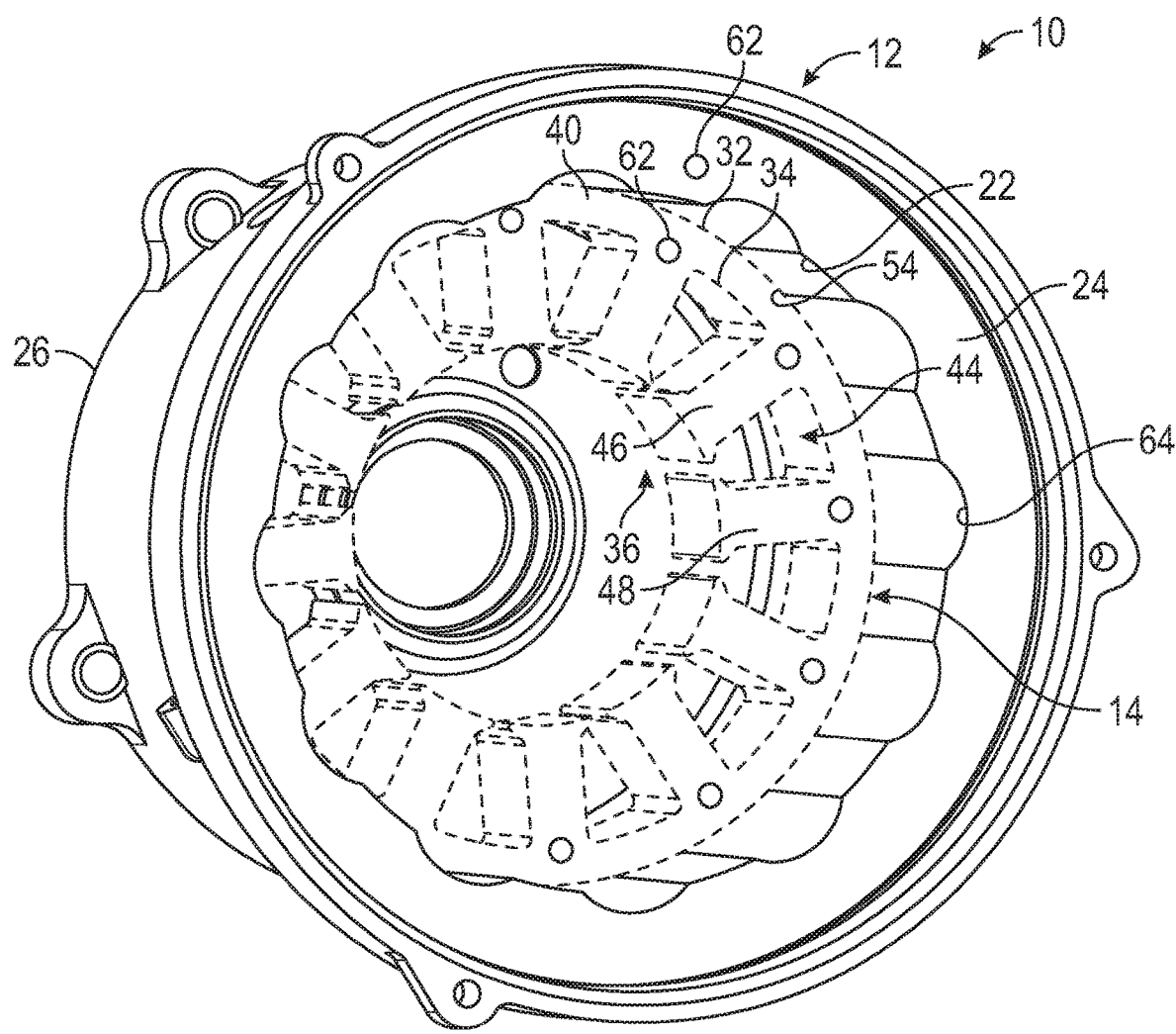
FIG. 1B is a partial perspective view of a stator disposed within an electric machine housing defining a discontinuous region.

Referring to FIGS. 1A and 1B, an electric machine, such as a permanent magnet machine 10 is shown. The permanent magnet machine 10 includes a machine housing 12 and a stator 14 that is arranged to be disposed within the machine housing 12.

The machine housing 12 is disposed about a central longitudinal axis 20. The machine housing 12 includes an inner surface 22 that extends between a first housing end 24 and a second housing end 26 along the central longitudinal axis 20. The first housing end 24 may be an open and the second housing end 26 may be a closed end. The second housing end 26 may define an opening 28 that is generally aligned along the central longitudinal axis 20 along which a shaft or the like may extend through.

The stator 14 is disposed within the machine housing 12 and is secured to the inner surface 22 of the machine housing 12. The stator 14 includes a stator core 30 that is disposed about the central longitudinal axis 20.

Referring to FIGS. 1A, 1B, 2A, and 3A, the stator core 30 includes an exterior surface 32, an interior surface 34 that is disposed opposite the exterior surface 32, and a plurality of stator teeth 36. The exterior surface 32 and the interior surface 34 each extend between a first face 40 and a second face 42 along the central longitudinal axis 20. The exterior surface 32 faces towards the inner surface 22 of the machine housing 12. The exterior surface 32 of the stator core 30 may be commonly referred to as the back iron of the stator 14. The plurality of stator teeth 36 radially extend from the interior surface 34 towards the central longitudinal axis. A slot 44 is defined between a first stator tooth 46 and a second stator tooth 48 that is disposed adjacent to the first stator tooth 46 of the plurality of stator teeth 36. In such an arrangement, the slot 44 is circumferentially disposed between the first stator tooth 46 and the second stator tooth 48.

The stator 14 may employ various fractional slot topologies, e.g. various ratios between a number of slots and a number of poles associated with the stator 14. The fractional slot topologies impact a winding factor about a stator tooth of the plurality of stator teeth 36 and hence impact the torque density. The higher the winding factor among them, the higher the torque density. The higher torque density may result in low order vibration modes. The low mode order results from the interaction of the n-th order radial field due to the magnet poles and n-th+2 order radial field due to armature reaction. The low mode order leads to stator deformation that leads to electric machine vibrations that is perceived as noise.

The present disclosure attempts to address these machine vibrations that are perceived as noise by modifying or reducing the number of points of contact 54 between the stator 14 and the inner surface 22 of the machine housing 12, as shown in FIG. 3B, by providing at least one of a discontinuous region 60, as shown in FIGS. 1-8, and/or openings 62 in the stator 14 and/or the machine housing 12, as shown in FIGS. 1A, 1B, 2A, and 2B.

The discontinuous region 60 may be defined by at least one of the inner surface 22 of the machine housing 12, as shown in FIG. 1B, or the exterior surface 32 of the stator core 30 of the stator 14, as shown in FIGS. 1A and 2A-8. Points of contact 54 between the inner surface 22 of the machine housing 12 and the exterior surface 32 of the stator core 30 within the discontinuous region 60 are used to join or connect the stator 14 to the machine housing 12 as well as to reduce machine vibrations that are perceived as noise.

The discontinuous region 60 may extend about the inner surface 22 of the machine housing 12, as shown in FIG. 1B. The discontinuous region 60 may be defined by recessed regions 64 of the inner surface 22 of the machine housing 12 and/or the exterior surface 32 of the stator 14. The recessed regions 64 may extend from the inner surface 22 towards an outer surface of the machine housing 12 along an axis that is disposed transverse to the central longitudinal axis 20. The discontinuous region 60 may extend about the exterior surface 32 of the stator 14, as shown in FIGS. 1A and 2A-8. The discontinuous region 60 may be defined by recessed regions 64 of the exterior surface 32 of the stator 14 that extend towards the interior surface 34 of the stator 14 along the axis that is disposed transverse to the central longitudinal axis 20.

The recessed regions 64 may be used to reduce the points of contact 54 between the inner surface 22 of the machine housing 12 and the exterior surface 32 of the stator 14. The implementation of the recessed regions 64 (the discontinuous region 60) on the inner surface 22 of the machine housing 12 and maintaining a uniform or substantially uniform exterior surface 32 of the stator 14, the potential for magnetic loss of the permanent magnet machine 10 due to discontinuities on the exterior surface 32 of the stator 14 may be minimized.

The opening 62 extends from the first face 40 towards the second face 42 along the central longitudinal axis 20. The opening 62 is radially disposed between the exterior surface 32 and the interior surface 34 of the stator core 30. The opening 62 may extend from a face of the machine housing 12 that is disposed at the first housing end 24 towards the second housing end 26 along the central longitudinal axis 20.

The discontinuous region 60 and/or the openings 62 are arranged to facilitate the damping of radial forces that may be transmitted through a stator tooth of the plurality of stator teeth 36 and the exterior surface 32 to the machine housing 12 to reduce perceived noise.

Referring to FIGS. 1A, 1B, 2A, 2B, and 8, the discontinuous region 60 is at least partially defined by at least one of a first raised region 70 and a second raised region 72. The first raised region 70 and the second raised region 72 may be raised radially relative to the exterior surface 32 of the stator core 30. The first raised region 70 and the second raised region 72 may at least partially define the points of contact 54 that are arranged to engage the inner surface 22 of the machine housing 12 to facilitate the connection between the stator 14 and the machine housing 12.

At least one of the first raised region 70 and the second raised region 72 is radially and/or circumferentially aligned with a stator tooth of the plurality of stator teeth 36, as shown in FIG. 2B. At least one of the first raised region 70 and the second raised region 72 is circumferentially disposed between the first stator tooth 46 and the second stator tooth 48 of the plurality a stator teeth 36 such that at least one of the first raised region 70 and the second raised region 72 is circumferentially aligned with the slot 44. At least one of the first raised region 70 and the second raised region 72 circumferentially extends across the first stator tooth 46, the slot 44, and the second stator tooth 48, as shown in FIG. 8.

The first raised region 70 and the second raised region 72 may be defined by the exterior surface 32 of the stator core 30 or may be plates or the like that are disposed on or joined to the exterior surface 32 of the stator core 30. The first raised region 70 is disposed proximate the first face 40 of the stator core 30. The second raised region 72 is disposed proximate the second face 42 of the stator core 30. The second raised region 72 is circumferentially spaced apart from the first raised region 70 such that a circumferential gap 74 is defined between sides of the first raised region 70 and the second raised region 72. The second raised region 72 is axially spaced apart from the first raised region 70.

Referring to FIGS. 2B and 8, at least one of the first raised region 70 and the second raised region 72 includes a first side 80, a second side 82, and a contact surface 84. The first side 80 radially extends from the exterior surface 32. The second side 82 is disposed opposite the first side 80. The second side 82 radially extends from the exterior surface 32. The contact surface 84 circumferentially extends between the first side 80 and the second side 82. The contact surface 84 is arranged to at least partially engage or contact the inner surface 22 of the machine housing 12.

At least one of the first raised region 70 and the second raised region has an axial length 90 and an arc length 92, as shown in FIGS. 2A, 2B, and 8. The arc length 92 may be greater than the axial length 90. In at least one embodiment, the arc length 92 may be less than or substantially equal to the axial length 90.

Referring to FIGS. 3A, 3B, and 4-7, the discontinuous region 60 may be a profiled region that extends about at least one of the inner surface 22 of the machine housing 12 and/or the exterior surface 32 of the stator 14. The profiled region may be a wavelike profile or the like that is at least partially defined by at least one of a first perturbation 100 and a second perturbation 102. At least one of the first perturbation 100 and the second perturbation 102 is defined by the exterior surface 32 of the stator core 30. A portion of at least one of the first perturbation 100 and the second perturbation 102 at least partially define the points of contact 54 that are arranged to engage the inner surface 22 of the machine housing 12 to facilitate the connection between the stator 14 and the machine housing 12.

At least one of the first perturbation 100 and the second perturbation 102 radially extends away from the central longitudinal axis and the exterior surface 32. At least one of the first perturbation 100 and the second perturbation 102 axially extends between the first face 40 and the second face 42.

The first perturbation 100 is circumferentially aligned with a stator tooth of the plurality of stator teeth 36, as shown in FIGS. 3A, 5, and 7. The second perturbation 102 is circumferentially disposed between the first stator tooth 46 and the second stator tooth 48 of the plurality of stator teeth 36, as shown in FIGS. 3A and 7.

At least one of the first perturbation 100 and the second perturbation 102 is circumferentially aligned with a stator tooth of the plurality of stator teeth 36, as shown in FIG. 5. At least one of the first perturbation 100 and the second perturbation 102 is circumferentially aligned with the slot 44 that is circumferentially disposed between the first stator tooth 46 and the second stator tooth 48 of the plurality of stator teeth 36, as shown in FIGS. 3B and 6.

At least one of the first perturbation 100 and the second perturbation 102 has an arc length 106 or a circumferential width that is less than a circumferential width of at least one of the first stator tooth 46 and the second stator tooth 48. At least one of the first perturbation 100 and the second perturbation 102 has a circumferential width that is less than a circumferential slot with of the slot 44 that is defined between the first stator tooth 46 and the second stator tooth 48 of the plurality of stator teeth 36.

At least one of the first perturbation 100 and the second perturbation 102 has an arc length 106 that is substantially equal to a circumferential slot width of the slot 44 that is defined between the first stator tooth 46 and the second stator tooth 48 of the plurality of stator teeth 36, as shown in FIGS. 3B and 6.

At least one of the first perturbation 100 and the second perturbation 102 has an arc length 106 that is substantially equal to a circumferential width of the first stator tooth 46, the second stator tooth 48, and the slot 44 that is defined between the first stator tooth 46 and the second stator tooth 48 of the plurality of stator teeth 36, as shown in FIG. 4.

At least one of the first perturbation 100 and the second perturbation 102 has an arc length 106 that is substantially equal to a circumferential width of slots disposed on opposite circumferential sides of at least one of the first stator tooth 46 and the second stator tooth 48 of the plurality of stator teeth 36.

At least one of the first perturbation 100 and the second perturbation 102 has an arc length 106 that is substantially equal to a circumferential width of at least one of the first stator tooth 46 and the second stator tooth 48 of the plurality of stator teeth 36, as shown in FIG. 5.

At least one of the first perturbation 100 and the second perturbation 102 has an arc length 106 that is less than a circumferential width of the slot 44 that is defined between the first stator tooth 46 and the second stator tooth 48 of the plurality of stator teeth 36, as shown in FIG. 7. At least one of the first perturbation 100 and the second perturbation 102 has an arc length 106 that is substantially equal to a circumferential with at least one of the first stator tooth 46 and the second stator tooth 48 of the plurality of stator teeth 36, as shown in FIG. 7.

The discontinuous region 60 that is defined by the first raised region 70, the second raised region 72 and/or the first perturbation 100 and the second perturbation 102 modify the interface between the exterior surface 32 of the stator 14 and the inner surface 22 of the machine housing 12 by making the connection intermittent. The addition of these features at the outer periphery of the stator 14 does not affect torque or any other electromagnetic performance of the permanent magnet machine 10. The first raised region 70, the second raised region 72 and/or the first perturbation 100 and the second perturbation 102 may vary in number, size, and location about the exterior surface 32 of the stator 14 or about the inner surface 22 of the machine housing 12.

Regardless of the number or location of the features that define the discontinuous region 60, the discontinuous region 60 reduces force transmittal through a stator tooth of the plurality of stator teeth 36 to the machine housing 12 and therefore reduces radiated noise and vibration by reducing deformation of the stator 14 without compromising motor torque density. The number, size, or location of the discontinuous region 60 may be varied to adjust resonance frequencies.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A permanent magnet machine comprising:
    a machine housing having an inner surface that extends between a first housing end and a second housing end along a central longitudinal axis; and
    a stator disposed within the machine housing, the stator having a stator core having an exterior surface extending between a first face and a second face along the central longitudinal axis, at least one of the inner surface and the exterior surface defines a discontinuous region that is arranged to minimize points of contact between the inner surface and the exterior surface, wherein the discontinuous region is defined by a circumferential gap and an axial gap disposed between a first raised region and a second raised region, the first and second raised regions each extending radially outwardly from the exterior surface of the stator core, the first raised region comprising a pair of raised segments axially aligned and circumferentially offset from each other, the second raised region comprising a pair of raised segments axially aligned and circumferentially offset from each other, wherein the first raised region and the second region are axially offset from each other.

2. The permanent magnet machine of claim 1, wherein at least one of the first raised region and the second raised region is arranged to engage the inner surface of the machine housing.

3. The permanent magnet machine of claim 1, wherein at least one of the first raised region and the second raised region has an axial length and an arc length.

4. The permanent magnet machine of claim 3, wherein the arc length is greater than the axial length.

\* \* \* \* \*